(12) United States Patent
Risse

(10) Patent No.: US 6,650,506 B1
(45) Date of Patent: Nov. 18, 2003

(54) DOUBLE-SIDED DISK STORAGE USING A SINGLE CONFIGURATION OF MAGNETORESISTIVE HEAD

(76) Inventor: Patrick Risse, 2002 Katherine Pl., Roseville, CA (US) 95678

( * ) Notice: Subject to any disclaimer, the term of this patent is extended or adjusted under 35 U.S.C. 154(b) by 0 days.

(21) Appl. No.: 09/464,291

(22) Filed: Dec. 15, 1999

(51) Int. Cl.$^7$ ................................................. G11B 5/55
(52) U.S. Cl. ................................................... 360/264.2
(58) Field of Search ....................................... 360/264.2

(56) References Cited

U.S. PATENT DOCUMENTS

| | | |
|---|---|---|
| 4,761,699 A | 8/1988 | Ainslie et al. |
| 5,055,969 A | 10/1991 | Putnam |
| 5,103,359 A | 4/1992 | Marazzo |
| 5,140,482 A | 8/1992 | Kimura et al. |
| 5,161,074 A | 11/1992 | Forbord et al. |
| 5,202,804 A | 4/1993 | Takekado |
| 5,242,314 A | 9/1993 | Di Giulio et al. |
| 5,245,489 A | 9/1993 | Kimura et al. |
| 5,491,597 A | 2/1996 | Bennin et al. |
| 5,530,604 A | 6/1996 | Pattanaik |
| 5,550,694 A | 8/1996 | Hyde |
| 5,631,788 A | 5/1997 | Richards |
| 5,668,684 A * | 9/1997 | Palmer et al. |
| 5,685,734 A | 11/1997 | Kutz |
| 5,708,541 A | 1/1998 | Erpelding |
| 5,717,541 A | 2/1998 | Ycas et al. |
| 5,754,368 A * | 5/1998 | Shiraishi et al. |
| 5,776,706 A | 7/1998 | Siiman et al. |
| 5,781,380 A | 7/1998 | Berding et al. |
| 5,835,306 A | 11/1998 | Bennin |
| 5,844,751 A | 12/1998 | Bennin et al. |
| 5,844,753 A | 12/1998 | Inaba |
| 5,859,746 A | 1/1999 | Ishida et al. |
| 5,862,014 A | 1/1999 | Nute |
| 5,870,253 A | 2/1999 | Ogawa et al. |
| 5,876,216 A | 3/1999 | Schadewald, Jr. et al. |
| 5,883,759 A | 3/1999 | Schulz |
| 5,889,636 A | 3/1999 | Arya et al. |
| 5,894,458 A | 4/1999 | Takizawa et al. |
| 5,996,623 A | 12/1999 | Omberg |

* cited by examiner

Primary Examiner—Craig A. Renner

(57) ABSTRACT

A magnetic data recording system and apparatus providing the flexibility of using a magnetoresistive read/write head in other than its standard orientation. The invention includes a plurality of magnetic recording disks supported on a spindle rotated by a motor. A plurality of arms, each mounted to a common actuator for arcuate motion, support at their distal ends the magnetoresistive read/write heads. The arms suspend the heads in close proximity to upper and lower surfaces of the disks so that the heads may record signals thereto and read signals therefrom. Generally such systems comprise two sets of such heads, a set of up-heads designed for facing upward to read the bottom surface of a disk and another set of down-heads designed to face downward to read an upper surface of a disk. The present invention provides circuitry allowing the up heads to be used in a downward direction and conversely allows a down head to be used in an upward direction, thereby eliminating the need to manufacture and store an equal number of two different configurations of heads.

6 Claims, 7 Drawing Sheets

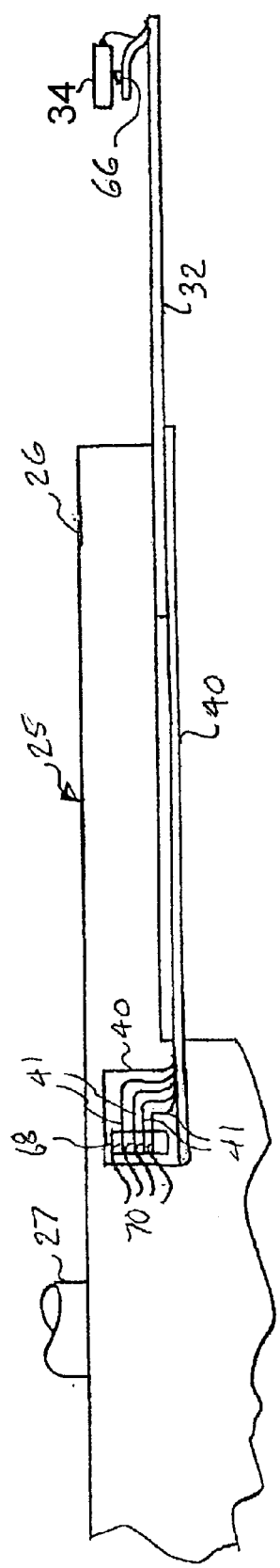

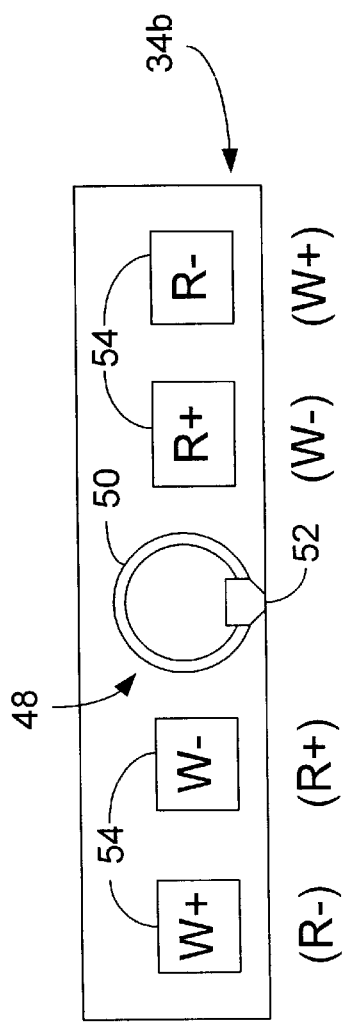
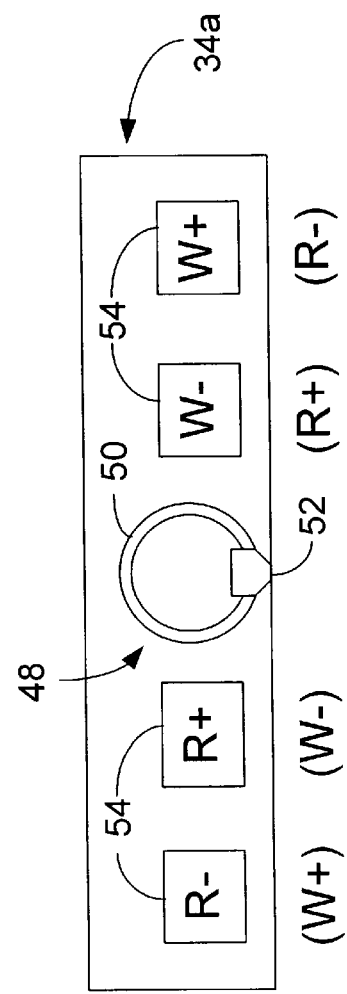
FIG. 2C
FIG. 2D

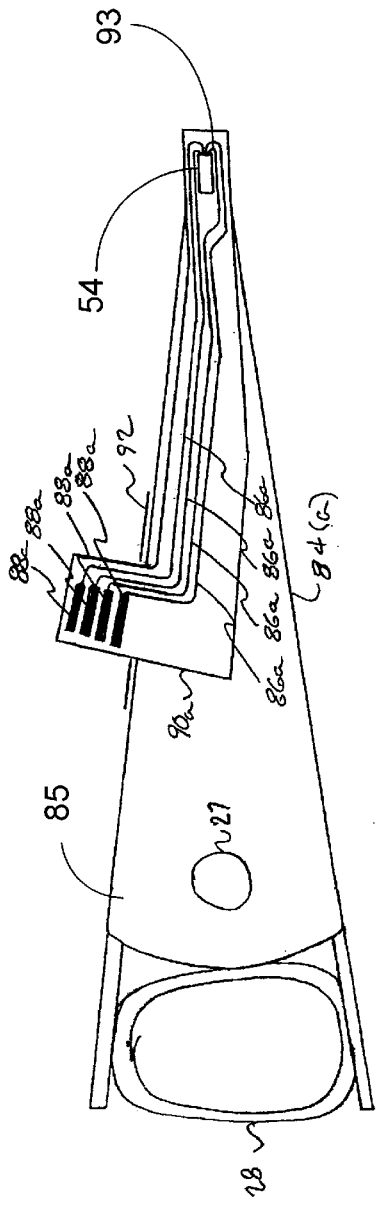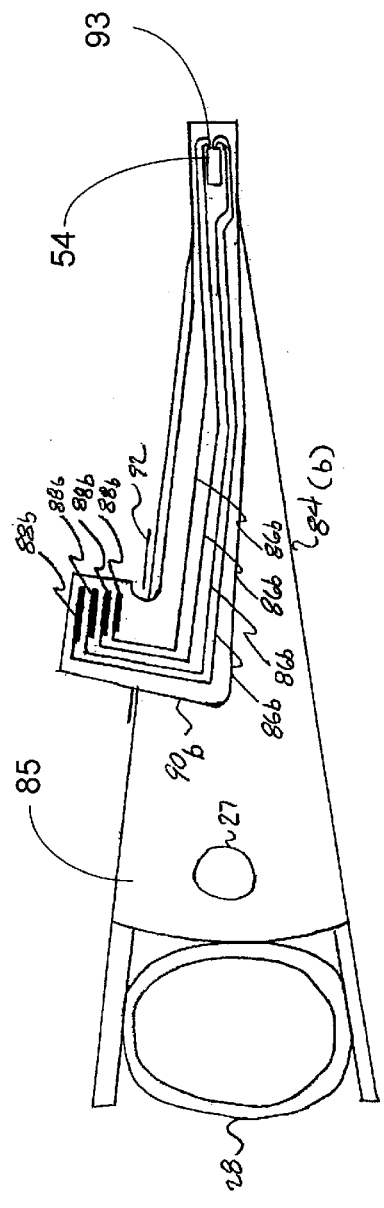

DOUBLE-SIDED DISK STORAGE USING A SINGLE CONFIGURATION OF MAGNETORESISTIVE HEAD

BACKGROUND OF THE INVENTION

1. Field of the Invention

The present invention relates to magnetic disk data storage systems, and more particularly to systems utilizing multiple disks and multiple read/write heads.

Magnetic disk drives are used to store and retrieve data for digital electronic apparatuses such as computers. In FIGS. 1A and 1B, a magnetic disk data storage system of the art is illustrated which includes a sealed enclosure 12 and a plurality of magnetic disks 14 each of which has an upper surface 16 and a lower surface 18. The disks are supported for rotation by a spindle 20 of a motor 22.

An actuator 24, includes an E-block 25 having at a distal end a plurality of actuator arms 26. The actuator 24 also includes a bearing 27 which mounts the actuator 24 pivotally within the enclosure 12 and further includes a voice coil 28 at its proximal end. The voice coil 28 is disposed between a pair of magnets 30 which are fixedly connected with respect to the enclosure 12. Generating an electrical current in the coil 28 induces a magnetic field about the coil. Interaction between the magnetic fields of the coil 28 and the magnets 30 provides a desired, controlled pivotal movement of the actuator about a pivot point 31 of the bearing.

The actuator arms 26 support a plurality of suspensions 32, each of which supports at its distal end a magnetic head 34. Each suspension 32 holds its corresponding magnetic head 34 in close proximity to a surface of one of the disks 14 to facilitate reading and recording data to and from the disk 14.

With reference now also to FIGS. 2A and 2B, as well as to FIGS. 1A and 1B, the suspension 32 includes suspension trace circuitry 36 which conducts electrical signals from the head 34 to a set of contacts 38 along an edge of the suspension 32. A bridge flex connector 40, having trace circuitry 41, electrically connects the suspension trace circuitry 36 with circuitry 42 (see FIG. 1A) attached to the E-block 25. The heads 34, suspensions 32, bridge flex connectors 40 and E-block 25 with E-block circuitry 42 together form a Head Stack Assembly 44 (HSA).

The motor 22 and spindle 20 cause the disks 14 to rotate. As the disks 14 rotate, the air immediately adjacent the disks 14 moves with the disks 14 as a result of friction and the viscosity of the air. This moving air passes between each of the heads 34 and its adjacent disk surface 16, 18 forming an air bearing. This air bearing causes the head to fly a very small distance from the disk surface 16, 18.

With reference to FIGS. 2C and 2D, as well as FIGS. 1A and 1B, each of the heads 34 includes a read element 46 and a write element 48 (FIG. 2E). As the disk surface 16 or 18 moves past the head 34 the write element 48 generates a magnetic field leaving magnetic data on the passing disk 14. Such write elements are generally in the form of an electrical coil 50 passing through a magnetic yoke 52. As a current passes through the coil 50 it induces a magnetic field which in turn generates a magnetic flux in the yoke 52. A gap (not shown) in the yoke causes the magnetic flux in the yoke to generate a magnetic field which fringes out from the gap. Since the gap is purposely located adjacent the disk, this magnetic fringing field imparts a magnetic data onto the passing magnetic disk 14.

With continued reference to FIGS. 2C and 2D, to read data from a disk 14, the read element 46 detects changes in surrounding magnetic fields caused by the disk 14 passing thereby. Several read elements have been used to read such data. A very effective read element currently in use is a GMR Spin Valve sensor. Such sensors take advantage of the changing electrical resistance exhibited by some materials when a passing magnetic field affects the magnetic orientation of adjacent magnetic layers. At its most basic level, a GMR spin valve includes a free magnetic layer and a pinned magnetic layer separated by a non-magnetic layer such as copper. The pinned layer has magnetization which is pinned in a pre-selected direction. The free layer, on the other hand, has a direction of magnetization which is perpendicular with the pinned layer, but is free to move under the influence of an external magnetic field such as that imparted by a passing magnetic recording medium. As the angle between the magnetic directions of the free and pinned layers changes, the electrical resistance through the sensor changes as well. By sensing this change in electrical resistance, the magnetic signal passing by the read element can be detected.

With continued reference to FIGS. 2A and 2C, in order to deliver an electrical signal to the write element or to receive an electrical signal from a read element, a set of electrical head contacts 54 are provided in the surface at the distal end of the head 34. These contacts 54 connect with the suspension trace circuitry 36 at the distal end of the suspension 32. The suspension 32 and the actuator arm 26 together form an arm assembly 33.(see FIGS. 1A and 1B).

The process of manufacturing the heads 34 and assembling them onto an arm assembly 33 causes slight variations in the magnetic directions of free and pinned layers of the spin valve. These changes can have devastating effects on the performance of the read element. In order to ensure correct alignment of the magnetic layers, after all of the Head Stack Assemblies (HSAs) 44 have been assembled the assemblies are passed through a carefully controlled magnetic field which ensures proper alignment of the magnetization within the read element. This process is known as Head Stack Assembly Reinitialization (HSA Reinitialization).

Please note that as used in the following discussion, and throughout this specification, the term "configuration" will be used to refer to the sequence of read elements and write elements and their contacts in a given head, and this configuration shall not chance regardless of the direction that this head is facing. The term "orientation" will refer to the order or sequence of elements or contacts presented by a head as it faces in different directions, i.e. facing upwards or downwards.

Note also that there will be a distinction made between an "up head" of the prior art and an "upward facing head", and likewise a distinction between a "down head" of the prior art and a "downward facing head", so that an up head may be used as a downward facing head, or a down head as an upward facing head. In the prior art, up heads and down heads required usually mirror image configurations. For example, an up head 34a facing downward may have a configuration of R−, R+, W− and W+, as shown by the symbols in boxes in FIG. 2D, and a down head 34B, also facing downward in the figure, would then have a configuration of W+, W−, R+ and R−, as also shown by the symbols in boxes in FIG. 2C. The "configurations" of the up and down heads do not change when the up heads and down heads are turned to face downward. In terms of their "orientation", however, the sequences do change, so that an up head now facing upward would now have an orientation of W+, W−, R+ and R−, shown by the symbols in parentheses in FIG. 2D, while a down head, now facing upward, would have an orientation of R−, R+, W− and W+, as shown by the symbols in parentheses in FIG. 2C.

Simply put, for this discussion, "configuration" is fixed by manufacture and "orientation" is achieved by turning the head rightside-up or upside-down.

Also, please note that for the sake of clarity in this discussion, the term "matching" will be used in describing a configuration of head, especially in the prior art, which is used in the same orientation for which its configuration is named (i.e., an up head facing upward or a down head used facing downwards). The term "non-matching" shall be used for the opposite cases (i.e. an up head facing downwards or a down head facing upwards).

With continued reference to FIGS. 1A and 2C, prior art systems require that two sets of heads 34 be used. One set of heads 34a is designed to face upward to read the lower surface of the disk 14, while the other set 34b is designed to face downward to read the upper surface of the disk 14. This required production of two sets of magnetic heads increases production and inventory costs but has been necessitated by several factors.

First, the HSA reinitialization of all heads simultaneously requires that the read elements 46, all face in the same directions in the assembly. This requires that the configuration of the read element 46 in an up head 34a be manufactured in an opposite sequence than that of a sensor in a down head 34b. Simply flipping a head 34 about its longitudinal axis would result in a read element 46 being oriented in the wrong direction.

Second, the orientation of a head 34 is dictated in part by the topography of an air bearing surface 56. FIG. 2E shows an air-bearing surface of a head 34, enlarged. The air-bearing surface includes a pair of rails 58 and has a leading edge 60 and a trailing edge 62. In order to maintain proper flight characteristics it is necessary to have the leading edge oriented into the direction of the oncoming air stream. For this reason it is not possible to simply flip a head about its lateral axis, as this would cause the trailing edge 62 of the air-bearing surface 56 to be oriented into the oncoming air stream.

Third, with reference to FIGS. 1A, 2A and 2C, signals from the contact pads 54 connect electrically with circuitry on the bridge flex connector 40 and circuitry 42 on the E-block 25. This requires that two different sets of heads 34a and 34b be used to ensure that the contacts 54 of both the up head 34a and the down head 34b connect with the appropriate circuitry 42 on the E-block 25.

This use of two different heads 34a and 34b adds to manufacturing expense and time as well as inventory cost. Additionally, oftentimes a manufacturing run will be more successful for one set of heads than another, leading to, for example, a greater inventory of up heads 34a than down heads 34b. Since the prior art requires that an equal number of each type of head be used, many heads become wasted. Valuable time is wasted as well while additional heads are manufactured. Therefore there remains a need for a system for allowing the use of a single configuration of head to be used in either the upward or downward orientation.

SUMMARY OF THE INVENTION

The present invention provides a system, and apparatus for using magnetoresistive heads of a single configuration in either an upward direction or a downward direction in a multiple disk magnetic storage device. The invention includes a plurality of arms each supporting a magnetic head. The arms are connected with an actuator which causes them to move about a pivot point to locate the heads in a desired location on the disks. According to the present invention, the arms are of two types. The first type of arm is for use with a head mounted in its "matching" orientation (i.e., an up head facing upward) and includes circuitry which electrically connects the contact pads of the head with a set of contact pads of a predetermined arrangement on the arm. The second arm is intended for use with a head oriented in other than its "matching" orientation, for example, an up head used in the downward direction. This second arm includes circuitry, different from that of the first arm, which directs electrical signals from the contacts of its attached head to contacts on the arm in the same predetermined arrangement as on the first arm. In this way any circuitry designed to pick up an array of signals from the first arm will be able to pick up the correct signal from the second arm in spite of the fact that the head of the second arm is being used in a "non-matching" orientation.

In a preferred embodiment of the invention, the first and second arms each include at their distal portions a suspension. The suspension is a flexible member which is attached at its proximal end, in a cantilevered fashion, to a distal end of an actuator arm and its distal end includes a gimbal for positioning the head. The actuator arm attaches at its proximal end to the actuator for arcuate movement about a pivot point of the actuator in unison with all other such arms similarly attached.

The suspension includes trace circuitry which conducts signals from the head contacts to a set of suspension contacts located on an edge of the suspension. The first and second arm assemblies both use suspensions with the same arrangement of suspension contacts.

Both the first and second arm assemblies include a Bridge Flex Connector (BFC), the BFC of the first arm assembly being unique as compared with that of the second arm assembly. The BFC used on the first arm assembly is a Standard BFC. It attaches at its distal end to the edge of the suspension and includes circuitry which picks up electrical signals from the suspension contacts located on that edge of the suspension. The circuitry of the Standard BFC routes the signals from the suspension contacts to a set of head stack assembly window contacts (HSA window contacts) located on the BFC and arranged in the aforementioned contact arrangement. From the BFC contacts, various circuitry can pick up and deliver signals as needed to record and read data.

The second arm assembly uses an Uni-Wafer BFC. Like the Standard BFC, the Uni-Waver BFC attaches at its proximal end to an edge of the actuator arm and at its distal end to an edge of the suspension. Also similar to the Standard BFC, the Uni-Wafer BFC picks up signals from the suspension contacts and includes circuitry which routes those signals to HSA window contacts arranged in the same predetermined arrangement as the Standard BFC at a location along the length of the Uniwafer BFC. The circuitry of the Uni-Wafer BFC, however, differs from the circuitry of the Standard BFC.

Because the head used on the second arm assembly has been flipped over and is not in its standard, matching orientation, the arrangement of the signals delivered to the suspension contacts from the head contacts will be different on the second arm than on the first arm. For example, if the head contacts are arranged on the head such that the suspension circuitry delivers that signal to the most distal contact in the suspension contact arrangement of the first arm assembly, that same signal would end up at the most proximal contact in the arrangement of suspension contacts on the second arm.

This is the reason that the circuitry of the Uni-Wafer BFC is different from the circuitry of the Standard BFC. The circuitry of the Uni-Wafer BFC picks up an arrangement of signals from the suspension of the second arm assembly which is essentially the mirror image of the arrangement of signals provided on the suspension of the first arm assembly. The circuitry of the Uni-Wafer BFC then routes those signals so that they appear in the same predetermined arrangement at the HSA window contacts as is delivered to the HSA window contacts of the first arm using the standard BFC.

An alternate embodiment of the invention also provides first and second arms. However this embodiment uses a Long Tail Trace Suspension Assembly (Long Tail TSA), and does not include a BFC. This embodiment includes a Standard Long Tail TSA in conjunction with an Uni-Wafer TSA. The Standard Long Tail TSA holds at its distal end a head which is mounted according to its matching orientation. The Standard Long Tail TSA includes circuitry which routs signals from the head contacts to a series of TSA window contacts, the signals arriving in a predetermined arrangement at the TSA window contacts. The circuitry resides on a thin stainless steel plate which is affixed to a suspension, thus forming the long tail trace suspension assembly. While the preferred embodiment employs a stainless steel plate, those skilled in the art will appreciate that the plate could be constructed of many other materials.

The Uni-Wafer Long Tail TSA holds at its distal end a head which is mounted opposite to its matching orientation, (i.e. flipped about its longitudinal axis). The Uni-Wafer Long Tail TSA includes circuitry which picks up signals from the contacts of this head (which are arranged as a mirror image of those of the head of the first arm) and routes those signals to a series of TSA window contacts located along the length of the Uni-Wafer TSA. As with the Standard Long Tail TSA, the circuitry of the UniWafer Long Tail TSA resides on a thin plate which is affixed to a suspension to form the TSA. The circuitry of the Uni-Wafer Long Tail TSA is routed such that the predetermined arrangement of signals at the Uni-Wafer TSA contacts is the same as the predetermined arrangement of the contacts of the Standard Long Tail TSA.

From the above, those skilled in the art will appreciate that the present invention provides a cost effective option for using heads of a single configuration in either the up or down direction as needed, saving valuable-time and money. These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

FIG. 2B is a view taken from line 2B—2B of FIG. 2A;

FIG. 2C is a view of a down head taken from line 2C—2C of FIG. 2A, shown enlarged;

FIG. 2D is a view of an up head taken from line 2C—2C of FIG. 2A, shown enlarged.

FIG. 4A is a plan view showing a Uni-Wafer long tail trace suspension assembly: and FIG. 4B is a plan view showing a standard long tail trace suspension assembly.

DETAILED DESCRIPTION OF THE PREFERRED EMBODIMENTS

Figures 1A, 1B:
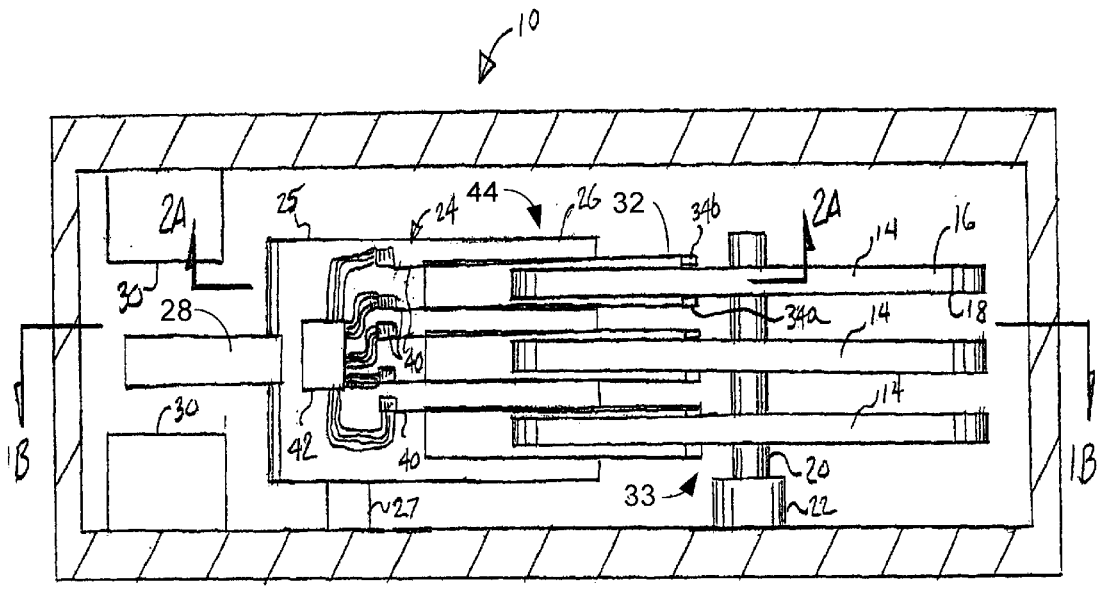
FIG. 1A is a partial cross-sectional front elevation view of a magnetic data storage system.
FIG. 1B is a top plan view taken along line 1B—1B of FIG. 1A.

With reference to FIGS. 1A and 1B, the present invention is embodied in a magnetic data storage system 10 housed within a sealed enclosure 12. The system 10 includes a plurality of magnetic disks 14 each of which has an upper surface 16 and a lower surface 18. The disks 14 are supported for rotation by a spindle 20 of a motor 22. An actuator 24, driven by a voice coil 28 to pivot about a pivot point 31 upon a pivot bearing 27, controls a plurality of actuator arms 26 which extend from an E-block 25 which pivots on the bearing 27. A suspension 32 extends from each actuator arm 26, each supporting at its distal end a magnetic head 34. Each suspension 32 holds its corresponding magnetic head 34 in close proximity to a disk 14 to facilitate reading and recording data to and from the disk 14. The suspension 32 and the actuator arm 26 together form an arm assembly 33. The heads 34, suspensions 32, bridge flex connectors 40 and E-block 25, including actuator arms 26 and E-block circuitry 42, together form a Head Stack Assembly 44 (HSA).

With reference to FIG. 1A, it will be appreciated that some of the magnetic heads 34a extend upward from the suspension 32 to read lower surfaces 18 of the disks 14, while other magnetic heads 34b extend downward from their corresponding suspensions 32 to read upper surfaces 16 of magnetic disks 14. The present invention allows the same configuration of magnetic head to be used in either the upward or downward facing direction.

As discussed above, please note that as used in this discussion, the term "configuration" will be used to refer to the sequence of read elements and write elements and their contacts in a given head, and this configuration shall not change regardless of the direction that this head is facing. The term "orientation" will refer to the order or sequence of elements presented by a head as it faces in different directions, i.e. facing upwards or downwards.

Note also that there will be a distinction made between an "up head" of the prior art and an "upward facing head", and likewise a distinction between a "down head" of the prior art and a "downward facing head", so that an up head may be used as a downward facing head, or a down head as an upward facing head. In the prior art, up heads and down heads required usually mirror image configurations. For example, an up head 34a facing downward may have a configuration of R−, R+, W− and W+, as shown by the symbols in boxes in FIG. 2D, and a down head 34B, also facing downward in the figure, would then have a configuration of W+, W−, R+ and R−, as also shown by the symbols in boxes in FIG. 2C. The "configurations" of the up and down heads do not change when the up heads and down heads are turned to face downward. In terms of their "orientation", however, the sequences do change, so that an up head now facing upward would now have an orientation of W+, W−, R+ and R−, shown by the symbols in parentheses in FIG. 2D, while a down head, now facing upward, would have an orientation of R−, R+. W− and W+, as shown by the symbols in parentheses in FIG. 2C. Thus, an up head facing upward has an orientation of contacts of W+, W−, R+ and R− (FIG. 2D in parentheses) and a down head facing downward has the same orientation of contacts, W+, W−, R+, R−, (FIG. 2C in boxes). This is what allowed the prior art to use a single type of Bridge Flex Connector for both an up head facing upward and a down head facing downward.

In contrast, the present invention uses only a single configuration of head, so there are no longer "up heads" and "down heads", there are only upward facing heads and downward facing heads. As before, the "orientation" of the heads will change, so that there is a first orientation when a head is used as an upward facing head and a second orientation when a head is used as a downward facing head. Thus there must be a second type of Bridge Flex Connector for this second orientation, and this type is referred to here as a Uni-wafer Bridge Flex Connector 74, as will be discussed below. It is however much more cost-effective to manufacture a second type of suspension contact array than to manufacture separate "up heads" and "down heads".

Also, please note that for the sake of clarity in this discussion, the term "matching" will be used in describing a configuration of head, especially in the prior art, which is used in the same orientation for which its configuration is named (i.e., an up head facing upward or a down head used facing downwards). The term "non-matching" shall be used for the opposite cases (i.e. an up head facing downwards or a down head facing upwards).

Figure 2A:
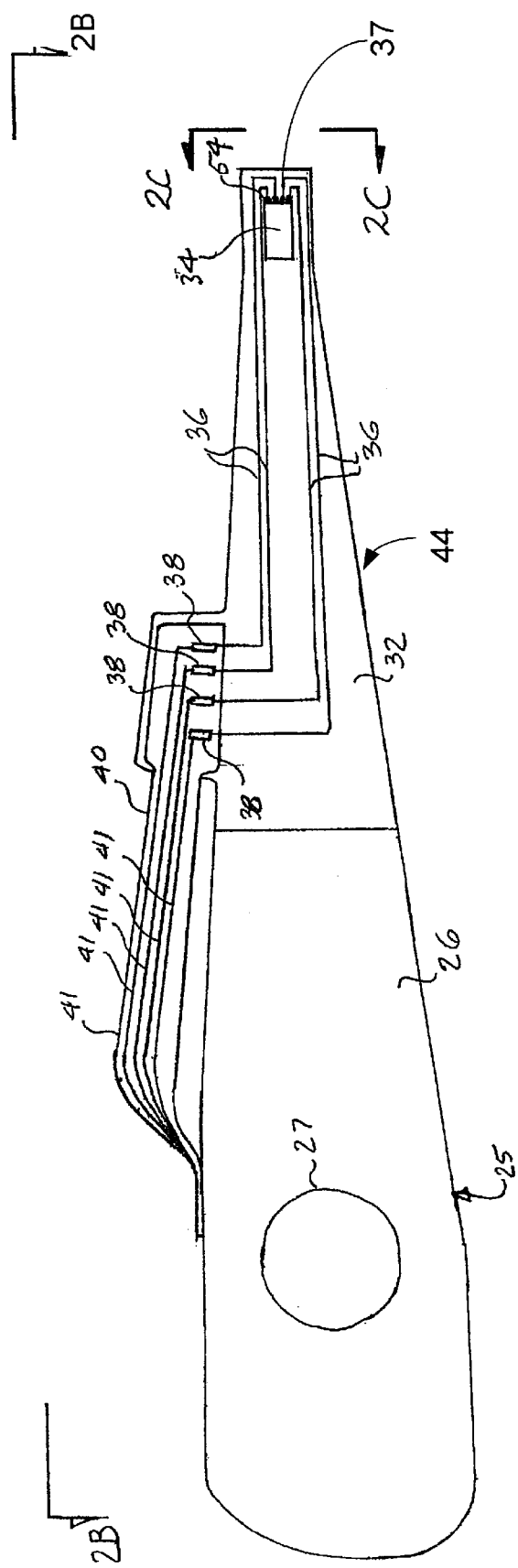
FIG. 2A is a view taken from line 2A—2A of FIG. 1A, shown enlarged.
Figure 2E:
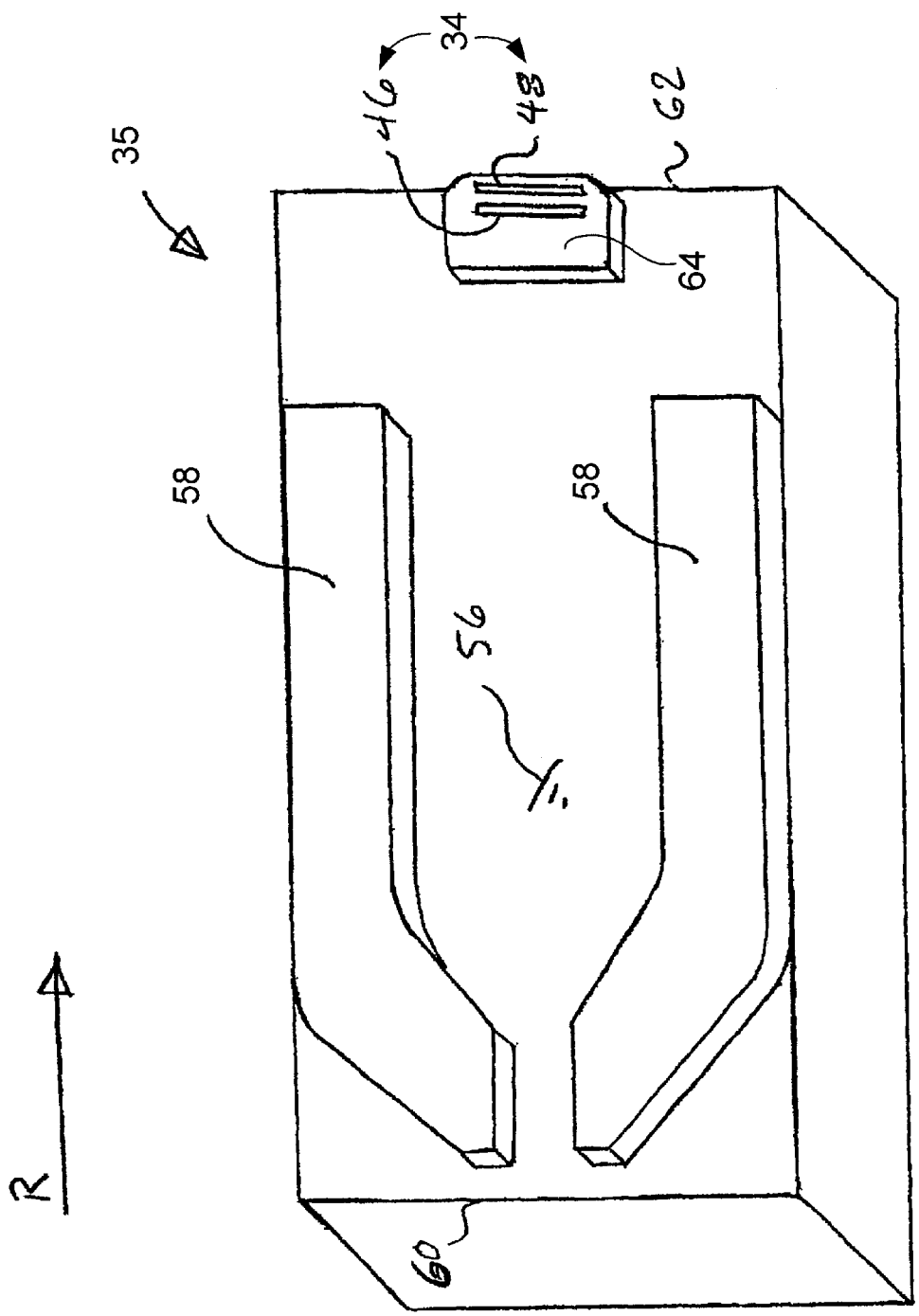
FIG. 2E is a perspective view of a slider showing an air-bearing surface of the slider.

With reference to FIG. 2E, the magnetic head 34, in cases such as the one shown, include a separate read head 46 and a separate write head 48, which together are commonly referred to as a head 34. The head 34 is usually mounted on a structure called a slider 35, which includes an air bearing surface 56. As a disk 14 spins, the viscosity of the surrounding air causes the air immediately adjacent to the disk to move with the disk. This causes air located between the slider 35 and the disk 14 to pass over the air bearing surface 56 of the slider 35 in the direction of arrow R, thereby creating an air bearing between the slider 35 and the disk 14. In this way the head 34, mounted on the slider 35, flies ever so slightly over the disk 14. The air bearing surface 56 has a leading edge 60 and a trailing edge 62. The air bearing surface 56 also includes rails 58 and a rear pad 64 which are specially configured to maximize the flight profile of the head 34 over the disk 14. A read element 46 and a write element 48 are provided in the head 34 and are generally disposed at the trailing edge 62 of the slider 35. As will be appreciated, in order to maintain proper flight characteristics, the head 34 on the slider 35 must be properly oriented with respect to the rotating disk 14 so that the leading edge 60 will be directed into the passing stream of air.

With reference now also to FIGS. 2C and 2D, the distal end of the head 34 adjacent the trailing edge 62 (FIG. 2E) includes a plurality of contacts 54 to provide electrical connection with the read and write elements 46, 48 (FIG. 2E) located within the head 34. In viewing FIGS. 2C and 2D, it is to be understood that the head 34 is taken to include the write head 48, which is visible here, and the read head 46 which is visible in FIG. 2E but not in FIGS. 2C and 2D, and the array of electrical contacts 54 connected to the read and write heads. Generally four contacts are provided, including a positive and a negative contact R+ and R− for the read sensor 46 as well as a positive and a negative contact W+ and W for the write sensor 48. A conductive coil 50 of the write sensor 48 can be seen to be centrally located at the end of the head 34. The coil 50 provides magneto-motive force to the write element and is covered with a dielectric layer. As discussed in the background of the invention, prior art systems have required the use of heads of different configurations, an up head for facing upward 34a (FIG. 2D) and a down head for facing downward 34b (FIG. 2C). Further reference to FIGS. 2C and 2D will make apparent that the arrangement of the contacts of the up head 34a is a mirror image of the arrangement of the contacts of the down head 34b.

With reference now also to FIGS. 2A and 2B, a gimbal 66 (FIG. 2B) connects the head 34 with the suspension 32. The contacts 54 (FIGS. 2A and 2C) of the head 34 connect electrically with a set of distal suspension contacts 37 on the suspension 32. The suspension traces 36 provide individual electrical paths from the distal suspension contacts 37 to a set of proximal suspension contacts 38 located at an edge of the suspension 32 near its proximal end. A Bridge Flex Connector (BFC) 40 attaches to the suspension 32 in the location of the proximal suspension contacts 38 and includes a series of BFC traces 41 which provide electrical conduits from the distal BFC contacts 67 to a Head Stack Assembly Window (HSA window) 68 (see FIGS. 2B and 3A) which locally exposes a portion of each of the trace circuits 41 to provide proximal BFC contacts 70 which can be seen more clearly with reference to FIG. 3A. With reference to FIG. 3A, at the distal end of the BFC 40, a window 65 exposes the BFC traces 41 to provide distal BFC contacts 67. The proximal BFC contacts 70 allow electrical connection with E-block circuitry 42 (FIG. 1A) for reading and writing signals during operation of the system 10. In order to allow the BFC 40 to attach to the side of the E-block 25, the BFC is bent about a bend line 72.

The BFC 40 shown in FIG. 3A(Prior Art) will be referred to as a Standard BFC 39, to distinguish it from the Uni-Wafer BFC 74 to be discussed below.

It will be appreciated that in order to use an up-head 34a in a downward orientation or conversely to use a down-head 34b in an upward orientation it is necessary to flip the head over. In order to ensure that the air bearing surface 56 remains correctly oriented with its leading edge 60 (FIG. 2E) facing into the air-stream, it is necessary to flip the head 34 about its longitudinal axis, that is, about the axis parallel with the length of the suspension 32. However, as can be seen with reference to FIGS. 2C and 2D, flipping over the heads 34a and 34b in this manner will alter the arrangement of the head contacts 54 with which the suspension traces 41 (FIG. 2A) must connect. This inverted orientation is shown in FIGS. 2C and 2D in parentheses below each set of contacts, where the configurations are shown in boxes.

Figure 3B:
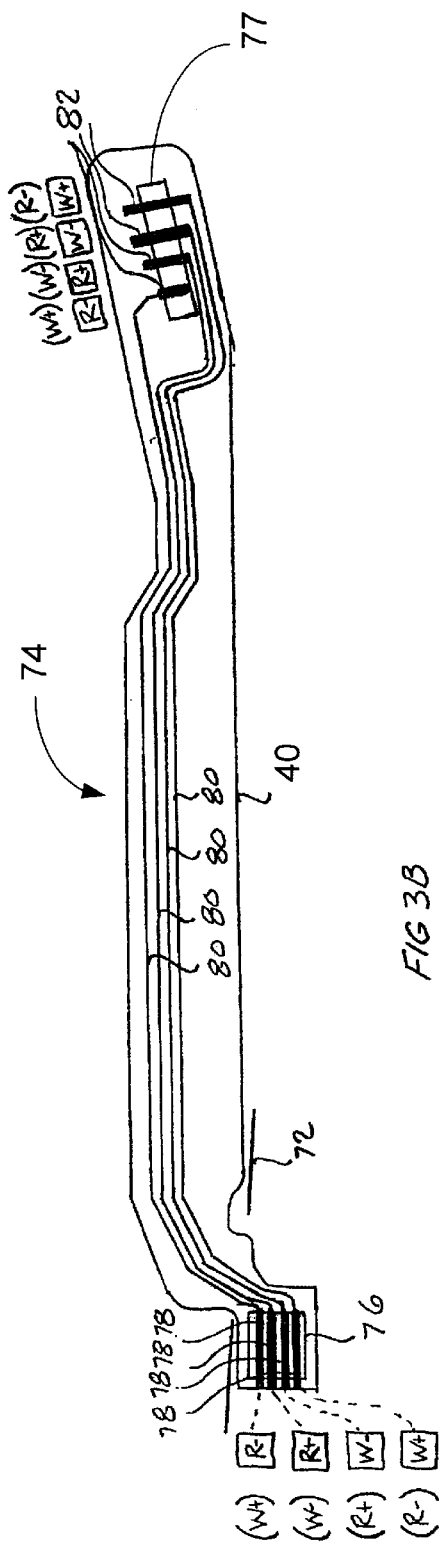
FIG. 3B is a plan view showing a Uni-Wafer bridge flex connector.
Figure 3A:
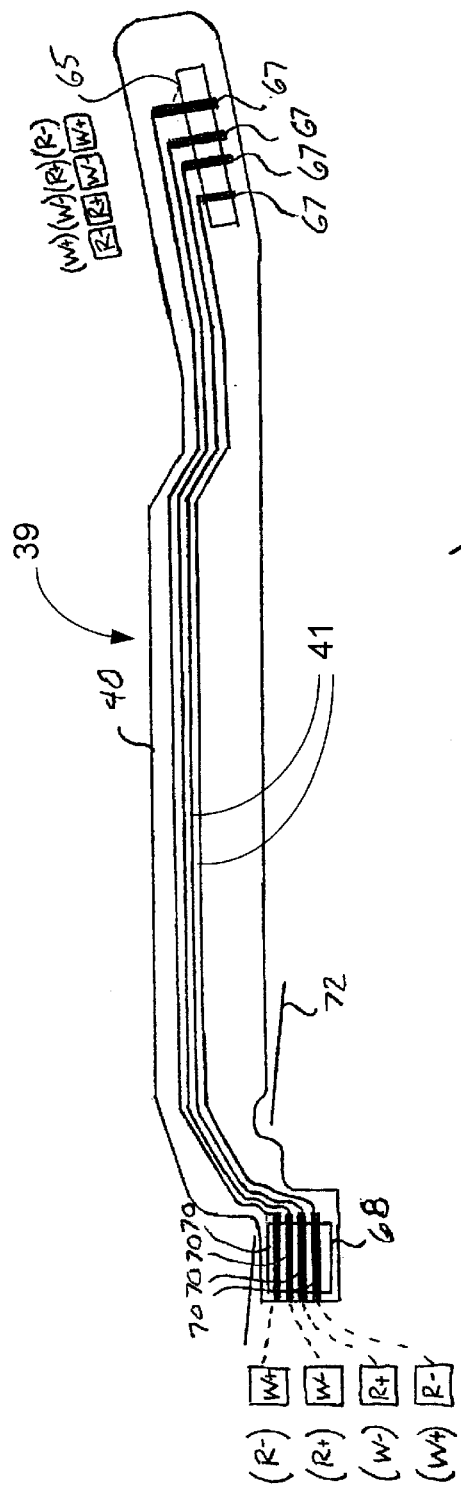
FIG. 3A is a plan view showing a standard bridge flex connector.

With reference to FIG. 3B, the present invention includes a second kind of BFC 40 which will be called a Uni-Wafer BFC 74 which compensates for this inverted orientation of head contacts. Like the BFC 40 discussed above, the Uni-Wafer BFC 74 has an HSA window 76 exposing proximal Uni-wafer BFC contacts 78 and includes trace circuitry 80 which routes signals from a set of distal Uni-wafer BFC contacts 82 to the correct proximal Uni-wafer BFC contact 78 when a head 34 is being used in an orientation other than its matching orientation. Distal Uni-wafer BFC contacts are accessed through distel Uni-wafer window 77.

By way of example, in FIGS. 3A and 3B the orientation of signals of a down head 34b used in a downward direction are shown in boxes whereas the orientation of signals of a down head 34b used in an upward direction is shown in parentheses. If a down head 34b were to be used in an upward direction with the Uni-Wafer BFC 74, the orientation of signals picked up from suspension contacts 38 (FIG. 2A) by the distal Uni-wafer BFC contacts 82 and delivered to the proximal Uni-wafer BFC contacts 78 would be as shown in parentheses in FIG. 3B. By comparison with FIG. 3A, wherein the orientation of a down head 34b used in a downward direction is shown in boxes, it can be seen that, although the orientation of signals picked up from the proximal suspension contacts 38 (FIG. 2A) are reversed, the orientations of the signals at the proximal BFC contacts 70 and proximal Uni-wafer BFC contacts 78 (FIG. 3A (Prior Art)) are the same for both the Standard BFC 39 and the Uni-Wafer BFC 74.

To see this, compare the set of signal inputs in boxes at the distal BFC contacts 67 of the Standard BFC 39 shown in FIG. 3A (prior art), reading from left to right R−, R+, W−, W+, and the set of signals in parenthesis at the distal Uni-wafer BFC contacts 82 in FIG. 3B, reading W+, W−, R+, R−. These signals are mirror images of each other and represent the two orientations of signals from heads with a single common configuration, one of which has been inverted. Then, compare the order of signals in boxes at the proximal BFC contacts 70 in the Standard BFC 39 (FIG. 3A (prior art)) and the signals in parentheses at the proximal Uni-wafer BFC contacts 78 of the Uni-wafer BFC 74 in FIG. 3B. Both sets of signals read from top to bottom, W+, W−, R+, R−.

If the down head 34b were to be used in an upward direction on the Standard BFC 39 as shown in parentheses in FIG. 3A, the orientation of signals at the HSA window 68 and at the proximal BFC contacts 70 would be incorrect. Circuitry picking up signals at these contacts would pick up the wrong signals or would have to be specially configured for two different arrangements of contact orientation, at great expense.

By using the standard BFC 39 when a head is being used in its matching orientation, and using a Uni-Wafer BFC 74 when a head is used in the non-matching orientation, a single configuration of head can be used for both orientations reducing cost and manufacturing time. It should be noted that the same Uni-Wafer BFC 74 can be used to allow an up head 34a to be used in a downward orientation.

Referring to all figures generally now, to construct the system 10 of the present invention, the heads 34, whether up or down heads, must first be manufactured as well as the suspension 32, actuator arm 26 and bridges (both Standard BFC 40 and Uni-Wafer 74). The head 34 can be manufactured by various photolithographic and other processes familiar to those skilled in the art and is preferably constructed with a GMR spin valve as the read element 46, although other read elements can also be used. The head 34 is then attached to the gimbal 66 (FIG. 2B) of the suspension 32 using an adhesive and the head contacts 54 are coupled with the corresponding distal suspension contacts 37 (FIG. 2A). The suspension 32 can then be attached to the actuator arm 26.

It will be appreciated by those skilled in the art that a GMR spin valve generally in use as a read element 46 includes free and pinned magnetic layers, and that proper orientation of the magnetization of these layers is critical to the performance of the read element. However, it has been found that the process of manufacturing the head 34 introduces variances in the orientation of magnetization of these layers. In order to ensure that each head 34 has the correct magnetic orientation, either before or after assembling the head 34 onto the suspension 32 the head 34 must be subjected to a controlled magnetic field prior to assembly onto the E-block 25. This process is known as HSA Reinitialization. By magnetizing the heads individually rather than simultaneously, the heads can be correctly magnetized in spite of the non-uniform orientations of the read elements 46 therein.

With the heads 34 properly magnetized, the heads 34 and suspension 32 can be assembled onto the E-block 25 and the E-Block 25 installed onto the bearing 27. The disks 14 are assembled onto the spindle 20 and spindle motor 22 such that each head 34 can align with its corresponding disk surface 16 or 18. The manufacture of circuitry 42 on the E-block 25 for writing and reading signals to and from the head 34 will be familiar to those skilled in the art.

With reference to FIGS. 4A and B, another embodiment of the invention also provides the flexibility of using a single configuration of head 34 in both the upward and downward directions. This embodiment includes a long tail trace suspension assembly (TSA) 85, of which FIG. 4B shows a Standard Long Tail Trace Suspension Assembly (Standard TSA) 84a. The TSA 85 serves as both an actuator arm and a suspension and has no flexible bridge portion. The invention includes two variations of TSA 85, the first being a Standard TSA 84a, (seen in FIG. 4B) and the second being a Uni-Wafer Long Tail TSA (Uni-wafer TSA) 84b (seen in FIG. 4A).

With continued reference to FIGS. 4A and 4B, each variation of Long Tail TSA 84a and 84b includes trace circuitry 86a 86b which extends from distal TSA contacts 93 which connect to the head contacts 54 to proximal TSA contacts 88a, 88b. The trace circuitry 86a, 86b of this embodiment is preferably continuous from distal TSA contacts 93 to the proximal TSA contacts 88a, 88b. The trace circuitry 86a, 86b is held upon thin plates 90a, 90b which are affixed to the rest of the TSA 84a, 84b. The metal plates 90a, 90b and associated trace circuitry 86a, 86b are bent along a bend line 92 to provide proper placement of the window contacts 88a, 88b for connection with other circuitry (not shown) in a similar manner as described in the earlier discussed embodiment. Also, as with the earlier discussed embodiment, the present embodiment includes a bearing 27 and a voice coil 28.

Examination of FIG. 4A, reveals that the trace circuitry 86b of the Uni-Wafer TSA 84b differs from that of the Standard TSA 84a, in FIG. 4B. This ensures that read and write circuitry picking up signals from the TSA window contacts 88b will be able to pick up the correct signal from the correct contact regardless of whether the attached head is being used in its matching orientation on the Standard TSA 84a or upside down on the Uni-Wafer TSA 84b.

For example, if only up heads 34a are available, they can be attached with the Standard TSA 84a for use in the up direction. For use in the downward direction, the up heads 34a can be attached with the Uni-Wafer TSA 84b. The circuitry of the Uni-Wafer TSA will ensure that the signal from each of the head contacts 54 gets routed to the correct location at the TSA window contact 88a, 88b.

In summary, the present invention provides a cost effect option for using a single set of heads in either the up or down direction as needed, saving valuable time and money. While the invention has been described in terms of multiple embodiments, other embodiments, including alternatives, modifications, permutations and equivalents of the embodiments described herein will be apparent to those skilled in the art from consideration of the specification, study of the drawings, and practice of the invention. The embodiments described should, therefore, be considered as exemplary, with the invention being defined by the appended claims, which include all such alternatives, modifications, permutations and equivalents as fall within the true spirit and scope of the present invention.

What is claimed is:

1. A magnetic data recording and retrieval system, comprising:
    a housing;
    at least one magnetic disk having an upper surface and a lower surface and rotationally mounted within said housing;
    a plurality of heads, each including at least one read element and at least one write element and each having a plurality of head electrical contacts, said head electrical contacts all being of a single configuration common to all of said plurality of heads;
    a plurality of long tail trace suspension assemblies for connection with said plurality of heads, at least one of which is an upward facing head and at least one of which is a downward facing head, each of said plurality of long tail trace suspension assemblies having a distal end and a proximal end, said distal end having distal long tail trace suspension contacts which connect to said head electrical contacts of one of said plurality of heads, and said proximal end having proximal long tail trace suspension contacts, and electrical trace circuitry connecting said distal long tail trace suspension contacts and said proximal long tail trace suspension contacts; and
    said long tail trace suspension assemblies including circuitry which is configured to compensate for the orientation of said electrical contacts in said upward facing head as compared with the orientation of electrical contacts of said downward facing head, where said upward facing head and said downward facing head both have a single configuration of contacts.

2. The magnetic data recording and retrieval system of claim 1, wherein:
    said plurality of long tail trace suspensions include standard long tail trace suspensions and uni-wafer long tail trace suspensions.

3. A magnetic data recording and retrieval system, comprising:
    a housing;
    at least one magnetic disk having an upper surface and a lower surface and rotationally mounted within said housing;
    a plurality of heads, each including at least one read element and at least one write element and each having a plurality of head electrical contacts, said head electrical contacts all being of a single configuration common to all of said plurality of heads;
    a first long tail trace suspension assembly having a distal end and a proximal end, said distal end having distal long tail trace suspension contacts which connect to said head electrical contacts of a first of said plurality of heads, and said proximal end having proximal long tail trace suspension contacts, and electrical trace circuitry connecting said distal long tail trace suspension contacts and said proximal long tail trace suspension contacts, where said first head is a downward facing head proximal to said upper surface of one of said at least one disk;
    a second long tail trace suspension assembly having a distal end and a proximal end, said distal end having distal long tail trace suspension contacts which connect to said head electrical contacts of a second of said plurality of heads, and said proximal end having proximal long tail trace suspension contacts, and electrical trace circuitry connecting said distal long tail trace suspension contacts and said proximal long tail trace suspension contacts, where said second head is a upward facing head proximal to said lower surface of one of said at least one disk; and
    said long tail trace suspension assemblies including circuitry which is configured to compensate for the orientation of said electrical contacts in said upward facing head as compared with the orientation of electrical contacts of said downward facing head, where said upward facing head and said downward facing head both have a single configuration of contacts.

4. The magnetic data recording and retrieval system of claim 3, wherein:
    said long tail trace suspension assemblies include standard long tail trace suspensions and uni-wafer long tail trace suspensions.

5. A magnetic data recording and retrieval system, comprising:
    a housing;
    at least one magnetic disk having an upper surface and a lower surface and rotationally mounted within said housing;
    a plurality of heads, each including at least one read element and at least one write element and each having a plurality of head electrical contacts, said head electrical contacts all being of a single configuration common to all of said plurality of heads;
    a first suspension having a distal end and a proximal end, said distal end having distal suspension contacts which connect to said head electrical contacts of a first of said plurality of heads, and said proximal end having proximal suspension contacts, and suspension trace circuitry connecting said distal suspension contacts and said proximal suspension contacts, where said first head is a downward facing head proximal to said upper surface of one of said at least one disk;
    a second suspension also having a distal end and a proximal end, said distal end having distal suspension contacts which connect to said head electrical contacts of a second of said plurality of heads, and said proximal end having proximal suspension contacts, and suspension trace circuitry connecting said distal suspension contacts and said proximal suspension contacts, where said second head is an upward facing head proximal to said lower surface of one of said at least one disk; and
    a plurality of bridge flex connectors connected to said first and second suspensions, each bridge flex connector having a distal end and a proximal end, said distal end having distal bridge flex connector contacts which connect to said proximal suspension contacts of said first and second suspensions, and said proximal end having proximal bridge flex connector contacts, and electrical trace circuitry connecting said distal bridge flex connector contacts and said proximal bridge flex connector contacts, said bridge flex connectors including circuitry which is configured to compensate for the orientation of said electrical contacts in said upward facing head as compared with the orientation of electrical contacts of said downward facing head, where said upward facing head and said downward facing head both have a single configuration of contacts.

6. The magnetic data recording and retrieval system of claim 5, wherein:
    said plurality of bridge flex connectors include standard bridge flex connectors and uni-wafer bridge connectors.

* * * * *